R. S. PENNIMAN, Jr., AND N. M. ZOPH.
PROCESS OF MANUFACTURING IRON COMPOUNDS.
APPLICATION FILED JUNE 20, 1917.
1,327,061.
Patented Jan. 6, 1920.
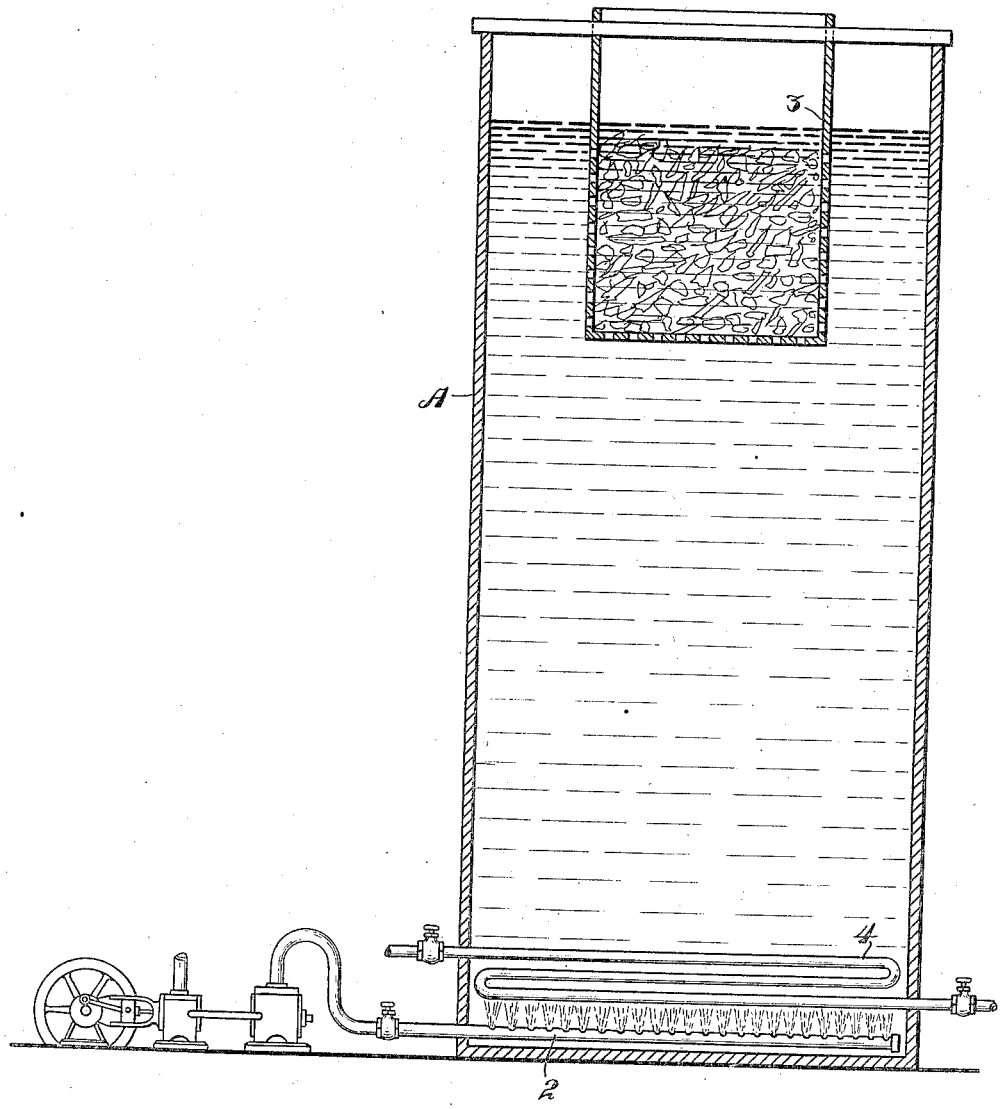
WITNESS
INVENTORS:
Russell S. Penniman Jr.
Norman M. Zoph
BY
Strong & Townsend
ATTORNEYS

UNITED STATES PATENT OFFICE.

RUSSELL S. PENNIMAN, JR., AND NORMAN M. ZOPH, OF BERKELEY, CALIFORNIA, ASSIGNORS TO WEST COAST KALSOMINE COMPANY, A CORPORATION OF CALIFORNIA.

PROCESS OF MANUFACTURING IRON COMPOUNDS.

1,327,061.      Specification of Letters Patent.      Patented Jan. 6, 1920.

Application filed June 20, 1917. Serial No. 175,837.

*To all whom it may concern:*

Be it known that we, RUSSELL S. PENNIMAN, Jr., and NORMAN M. ZOPH, citizens of the United States, residing at Berkeley, in the county of Alameda and State of California, have invented new and useful Improvements in Processes of Manufacturing Iron Compounds, of which the following is a specification.

This invention relates to a process for the manufacture of iron pigments from metallic iron, and pertains particularly to a method of converting metallic iron to a commercial pigment by immersion in a solution of a ferrous salt in the presence of heat and a suitable oxidizing agent, as air, to form ferric hydrate.

An apparatus suitable for the operation of the process is shown on the accompanying drawing.

According to the invention, metallic iron is immersed in a solution of a ferrous salt, preferably ferrous sulfate, and heat and oxygen supplied to the solution. The ferrous salt is oxidized to the ferric condition and hydrate of iron is precipitated. The metallic iron and the ferric salt react to regenerate the ferrous salt for further oxidation and repetition of the cycle.

This ferric hydrate which precipitates in the solution is, or can be, changed into the desired pigment. It does not correspond exactly to the formula for ferric hydrate, $Fe(OH)_3$, but contains some basic salt and is partially dehydrated. Its color is yellow or yellowish brown and it can be calcined or burned into a red oxid of iron, if desired.

The process is, as will be noted from the above, cyclic, continuous and self-sustaining, the only materials which it is necessary to add to maintain the reaction being the metallic iron and the oxidizing agent.

In practice, the process is carried on in a wooden or other acid-proof tank, such as shown at A, the oxygen being supplied by injecting air at the bottom of the tank through a perforated pipe 2 which receives air from a pressure blower or compressor. The air may also be injected with steam, if desired, and the air passed through the solution escapes from the top of the tank.

Metallic iron, preferably in the form of strips or thin sheets, is placed in the tank in sufficient quantity to prevent the formation of an excessive content of ferric iron compounds. The metallic iron may be supported in any suitable manner, or, as here shown, in a wooden or other acid-proof container 3 through which the solution may freely circulate.

In actual practice it has been found that air passing through a cold solution has very little oxidizing action upon the ferrous salt. The solution is, therefore, heated either with steam passing through coils shown at 4, by heating the oxidizing air which is passed through the solution, or in any other suitable manner, the temperature which causes the most economical oxidizing action being approximately 60° centigrade.

The pigment formed during the operation of the process may remain in the solution until the proper tone and quality have been obtained. The operation may then be stopped and the pigment filtered out. The pigment may then be dried and ground, or burned into a red oxid of iron, and marketed. The solution is, of course, returned to the tank and is continuously reused as the ferrous salt content is constantly being regenerated by the reduction of the ferric salt by the metallic iron.

While in practice we prefer to employ heated air or air and steam as the oxidizing agent, it is understood that we do not desire to be limited to such specific oxidizing means.

While the invention has been described as applied to sulfates of iron, it is to be understood that the process is applicable to any other water-soluble salt of iron.

Also, while I have described certain reactions as those which presumably take place, I do not wish to be understood as limiting myself to such reactions except where specifically claimed.

Obviously one may start the process with the ferric salt, since the immersed iron reduces the ferric salt to the ferrous state, which becomes reoxidized to the ferric condition by the oxidizing agent employed. Thus the cycle is ultimately the same and the same result is obtained whether one starts with the ferrous salt or the ferric salt.

Having thus described our invention, what we claim and desire to secure by Letters Patent is—

1. A process for manufacturing iron compounds which consists in immersing metallic iron in a solution of a ferrous salt, heating the solution, and introducing an oxidizing agent.

2. A process for manufacturing iron compounds which consists in immersing metallic iron in a solution of a ferrous salt, heating the solution, and forcing air through the solution.

3. A method of manufacturing iron compounds from metallic iron which consists in immersing metallic iron in a heated solution of ferrous salt, then oxidizing the iron while immersed to form a ferric salt and ferric hydrate, and permitting the ferric salt to react with the metallic iron to form ferrous salt which acts as a catalyzer to supply oxygen to the metallic iron and also permitting cyclic re-use of the solution.

4. The method of manufacturing iron compounds, which consists in immersing metallic iron in a heated solution of ferrous sulfate, and continuously supplying an oxidizing agent whereby the ferrous sulfate is converted to ferric sulfate and hydrate of iron is precipitated, permitting the metallic iron and ferric sulfate to react to regenerate the ferrous sulfate for further oxidation and repetition of the cycle, and recovering the hydrate.

5. The process of manufacturing iron compounds, which consists in the treatment of metallic iron, in a solution of a ferrous salt, in the presence of heat and an oxidizing agent to form a ferric salt and ferric hydrate and removing the ferric hydrate as a precipitate.

6. The method of manufacturing iron compounds, which consists in a continuous cyclical action by subjecting metallic iron to the action of a ferrous salt in the presence of heat and air to oxidize the ferrous salt and form a ferric salt and ferric hydrate, the ferric hydrate precipitating as the desired compound and the ferric salt in solution reacting with the metallic iron to produce a ferrous salt.

7. The process of manufacturing iron compounds, which consists in immersing metallic iron in a heated solution of a ferrous salt, and introducing air under pressure and in a divided condition into said solution.

8. The method of manufacturing iron compounds, which consists in immersing metallic iron in a solution of ferrous salt heated to approximately 60° C. and continuously supplying an oxidizing agent.

In testimony whereof we have hereunto set our hands in the presence of two subscribing witnesses.

RUSSELL S. PENNIMAN, Jr.
NORMAN M. ZOPH.

Witnesses:
J. ANDERSON,
W. W. CEX.